(12) United States Patent
Janson

(10) Patent No.: US 11,701,957 B1
(45) Date of Patent: Jul. 18, 2023

(54) ELECTRIC DRIVE AXLE WITH FIRST STAGE CHAIN DRIVE

(71) Applicant: FORD GLOBAL TECHNOLOGIES, LLC, Dearborn, MI (US)

(72) Inventor: David Allen Janson, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/737,624

(22) Filed: May 5, 2022

(51) Int. Cl.
| | |
|---|---|
| *B60K 1/02* | (2006.01) |
| *F16H 57/02* | (2012.01) |
| *B60L 53/20* | (2019.01) |
| *F16H 57/021* | (2012.01) |
| *F16H 37/04* | (2006.01) |
| *F16H 7/06* | (2006.01) |

(52) U.S. Cl.
CPC ............... *B60K 1/02* (2013.01); *B60L 53/20* (2019.02); *F16H 37/041* (2013.01); *F16H 57/021* (2013.01); *F16H 7/06* (2013.01); *F16H 2057/02034* (2013.01); *F16H 2057/02052* (2013.01)

(58) Field of Classification Search
CPC .......................... B60K 1/02; B60K 2007/0061; B60K 7/0007; B60K 7/00; B60K 17/046; B60K 17/14; B60K 17/145; F16H 37/041; F16H 57/021; F16H 2057/02034; F16H 2057/02052
See application file for complete search history.

(56) References Cited

U.S. PATENT DOCUMENTS

| | | | | |
|---|---|---|---|---|
| 1,984,830 | A * | 12/1934 | Higley | H02P 9/06 |
| | | | | 903/910 |
| 2,975,655 | A * | 3/1961 | Cox | B62D 11/10 |
| | | | | 475/23 |
| 4,917,200 | A * | 4/1990 | Lucius | B62D 11/10 |
| | | | | 475/23 |
| 5,842,947 | A | 12/1998 | Weilant | |
| 6,811,508 | B2 | 11/2004 | Tumback | |

(Continued)

FOREIGN PATENT DOCUMENTS

| | | | | |
|---|---|---|---|---|
| DE | 4134840 | A1 * | 4/1993 | ........... B60K 17/046 |
| DE | 10334546 | A1 * | 3/2004 | ............. B60K 17/02 |

(Continued)

*Primary Examiner* — Sherry L Estremsky
(74) *Attorney, Agent, or Firm* — Vincent Mastrogiacomo; Brooks Kushman P.C.

(57) ABSTRACT

A dual motor electric drive axle apparatus is disclosed that is enclosed within a single housing. First and second motors are disposed in the housing. First and second rotor shafts, and first and second chain drives including first and second driving sprockets are connected to the first rotor shaft. A first chain, and a first driven sprocket are connected to the first and second driving shafts by first and second chain respectively. First and second planetary gear sets having first and second input shafts are connected to the first and second driven sprockets. First and second output shafts are connected to first and second constant velocity joints that are located outside the housing. First and second axles are connected to the first and second constant velocity joints and are adapted to rotate first and second wheels respectively.

20 Claims, 4 Drawing Sheets

(56) References Cited

U.S. PATENT DOCUMENTS

| | | | |
|---|---|---|---|
| 7,954,574 B2 * | 6/2011 | Schoon | E02F 9/207 |
| | | | 180/6.48 |
| 8,678,118 B2 * | 3/2014 | Takenaka | B60K 6/52 |
| | | | 180/65.6 |
| 10,486,512 B2 * | 11/2019 | Bassis | B60K 17/354 |
| 10,570,971 B2 * | 2/2020 | Naitou | F16D 55/40 |
| 10,744,865 B2 | 8/2020 | Janson et al. | |
| 10,895,320 B2 * | 1/2021 | Suyama | B60L 15/20 |
| 11,052,745 B1 | 7/2021 | Janson et al. | |
| 2022/0314782 A1 * | 10/2022 | Shinozaki | B60K 17/046 |

FOREIGN PATENT DOCUMENTS

| | | | | |
|---|---|---|---|---|
| EP | 3988817 A1 * | 4/2022 | | F16H 48/11 |
| FR | 2818346 A1 * | 6/2002 | | B60K 6/445 |
| WO | WO-2013173915 A1 * | 11/2013 | | B60K 1/02 |

\* cited by examiner

ELECTRIC DRIVE AXLE WITH FIRST STAGE CHAIN DRIVE

TECHNICAL FIELD

The disclosure relates to an electric vehicle axle with dual motors that each have a first stage that is a chain drive input to a planetary gear set that drive the axle through constant velocity joints.

BACKGROUND

A dual motor electric axle with lay shaft gearing is too wide to fit between the frame rails of many vehicles. Offset motor designs also face issues relating to the height of the designs. In addition, there is limited space available for packaging the inverter system control for the dual motors of a split electric axle.

This disclosure is directed to solving the above problems and other problems as summarized below.

SUMMARY

According to one aspect of this disclosure, a dual motor electric drive axle apparatus is disclosed that is enclosed within a single housing. A first motor is disposed in the housing has a first rotor shaft, and a first chain drive including a first driving sprocket is connected to the first rotor shaft. A first chain, and a first driven sprocket are connected to the first driving shaft by the first chain. A first planetary gear set having a first input shaft is connected to the first driven sprocket, and a first output shaft connected to a first constant velocity joint that is located outside the housing. A first axle is connected to the first constant velocity joint and is adapted to rotate a first wheel that is located outside the housing. A second motor is disposed in the housing has a second rotor shaft, and a second chain drive including a second driving sprocket is connected to the second rotor shaft. A second chain, and a second driven sprocket are connected to the second driving shaft by the second chain. A second planetary gear set having a second input shaft is connected to the second driven sprocket, and a second output shaft connected to a second constant velocity joint that is located outside the housing. A second axle is connected to the second constant velocity joint and is adapted to rotate a second wheel that is located outside the housing.

According to other aspects of this disclosure, the housing may further comprise a right side portion, a left side portion, and a central portion joining the right side portion and the left side portion. The apparatus may further comprise a right side drive including the first motor and the first rotor shaft, wherein the first motor is disposed in the right side portion of the housing, and the first planetary gear set disposed in the right side portion of the housing; and a left side drive having a second electric motor and the second rotor shaft, wherein the second motor is disposed in the left side portion of the housing, and the second planetary gear set disposed in the left side portion of the housing.

The apparatus may further comprise a right inverter system controller assembled to a top surface of the housing above the first motor, and a left inverter system controller assembled to the top surface of the housing above the second motor. Alternatively, if the height of the unit including the housing and the inverters should be reduced the inverter systems may be mounted to the front side of the housing.

The housing is adapted to be assembled between a right frame rail and a left frame rail of a vehicle.

The first rotor shaft and the second rotor shaft may be aligned on a first axis and the first input shaft and the second input shaft may be aligned on a second axis that is offset from the first axis.

According to a second aspect of this disclosure, an apparatus is disclosed for driving a vehicle with two electric motors connected by a chain drive to a split axle. The apparatus includes a housing having a right side portion, a left side portion, and a central portion joining the right side portion and the left side portion. A right side drive includes a right electric motor and a right rotor shaft, the right motor is disposed in the right side portion of the housing, and a right planetary gear set is disposed in the right side portion of the housing. A left side drive includes a left electric motor and a left rotor shaft, the left motor is disposed in the left side portion of the housing, and a left planetary gear set is disposed in the left side portion of the housing. A dual chain drive including a right side chain, a right side drive sprocket, and a right side driven sprocket is disposed in the central portion of the housing, and a left side chain, a left side drive sprocket, and a left side driven sprocket disposed in the central portion of the housing. The right rotor shaft drives the right side drive sprocket, the right side chain, and the right side driven sprocket, and the left rotor shaft drives the left side drive sprocket, the left side chain, and the left side driven sprocket, wherein the right side driven sprocket drives an right side input shaft of the right planetary gear set, and wherein the left side driven sprocket drives a left side input shaft of the left planetary gear set.

Other alternatives for the second aspect of this disclosure may further comprise a right side output shaft of the right planetary gear set that is adapted to drive a right side axle and a right side wheel, and a left side output shaft of the left planetary gear set that is adapted to drive a left side axle and a left side wheel.

The right rotor shaft may extend from the right electric motor in the right side portion of the housing and into the central portion, and the left rotor shaft may extend from the left electric motor in the left side portion of the housing and into the central portion.

The apparatus may further comprise a central wall extending between a front wall and a rear wall, the central wall including bearing supports for the right rotor shaft, left rotor shaft, right side input shaft of the right planetary gear set, and the left side input shaft of the left planetary gear set. The apparatus may further comprise an antifriction bearing assembled to the bearing supports for the right rotor shaft, left rotor shaft, right side input shaft of the right planetary gear set, and the left side input shaft of the left planetary gear set.

A central wall may extend between a front wall and a rear wall, and the right side portion and the left side portion may be attached to opposite sides of the central portion.

A right inverter system controller and a left inverter system may be assembled to a top surface of the housing or the front surface of the housing. The housing may be adapted to be assembled between a right frame rail and a left frame rail. The first rotor shaft and the second rotor shaft may be aligned on a first axis and the first input shaft, and the second input shaft may be aligned on a second axis that is offset from the first axis.

According to a third aspect of this disclosure, a dual electric motor drive for a split axle chain drive for a vehicle is disclosed. The drive includes a right side motor having a right side rotor shaft and a left side motor having a left side rotor shaft, wherein the right side rotor shaft and the left side rotor shaft rotate about a first axis of rotation. A right side planetary gear set having a right side input shaft and a left side planetary gear set having a left side input shaft are disclosed, wherein the right side input shaft and the left side input shaft rotate about a second axis of rotation that is offset from the first axis of rotation. A right side chain is entrained about a right side driving sprocket secured to the right side rotor shaft and entrained about a right side driven sprocket secured to the right side input shaft, and a left side chain is entrained about a left side driving sprocket secured to the left side rotor shaft and entrained about a left side driven sprocket secured to the left side input shaft. A right side output shaft of the right side planetary gear set being connected to a right side constant velocity joint is adapted to rotate a right wheel, and a left side output shaft of the left side planetary gear set being connected to a left side constant velocity joint that is adapted to rotate a left wheel.

The dual electric motor drive for a split axle chain drive for a vehicle may further comprise a housing enclosing the right side motor, the left side motor, the right side planetary gear set, the left side planetary gear set, the right side chain, the right side driving sprocket, the right side driven sprocket and the right side input shaft, the left side chain, the left side driving sprocket, and the left side driven sprocket.

The dual electric motor drive for a split axle chain drive for a vehicle may further comprise a central wall extending between a front wall and a rear wall, the central wall including bearing supports for the right rotor shaft, left rotor shaft, right side input shaft of the right planetary gear set, and the left side input shaft of the left planetary gear set, and an antifriction bearing assembled to each of the bearing supports for the right rotor shaft, left rotor shaft, right side input shaft of the right planetary gear set, and the left side input shaft of the left planetary gear set.

The dual electric motor drive for a split axle chain drive for a vehicle may further comprise a right inverter system controller assembled to a top surface of the housing above the first motor, and a left inverter system controller assembled to the top surface of the housing above the second motor. The inverter systems could also be assembled to the front surface of the housing to reduce weight.

The dual electric motor drive for a split axle chain drive for a vehicle may include a housing that is adapted to be assembled between a right frame rail and a left frame rail.

The above aspects of this disclosure and other aspects will be described below with reference to the attached drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Figure 1:
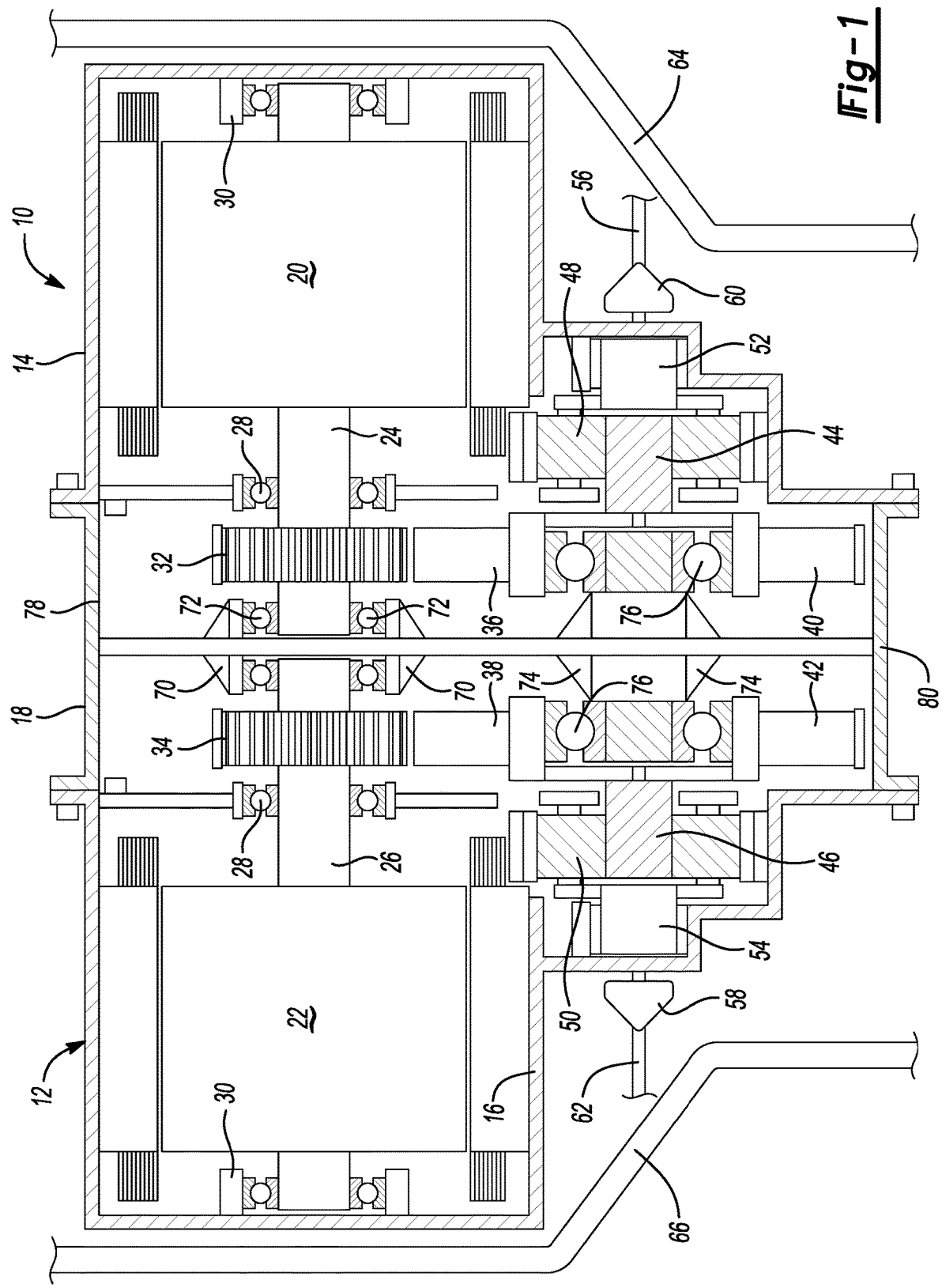
FIG. 1 is a horizontal cross-section view of a chain drive dual motor and a split electric axle.

Referring to FIG. 1, a chain drive dual motor electric axle is generally indicated by reference numeral 10. The chain drive dual motor electric axle is substantially enclosed within a housing 12. The housing 12 has a right side portion 14 and a left side portion 16 that are assembled to a central portion 18.

A right side motor 20 and a left side motor 22 include a right side rotor 24 and a left side rotor 26, respectively. The rotors 24, 26 are each supported within the housing 12 on front anti-friction bearings 28 and rear anti-friction bearings 30. On a first rotational axis, the right side rotor 24 is attached to a right side driving sprocket 32 and the left side rotor 26 is attached to a left side driving sprocket 34. A right chain 36 operatively connects the right side driving sprocket 32 to a right side driven sprocket 40 to transfer torque from the right side rotor 26 that lies on a first rotational axis to the right side driven sprocket 40 that lies on a second rotational axis. A left chain 38 operatively connects the left side driving sprocket 34 to a left side driven sprocket 42 to transfer torque from the left side rotor 26 that lies on the first rotational axis to the left side driven sprocket 42 that lies on the second rotational axis.

A right input shaft 44 and a left input shaft 46 are connected to the input of the right planetary gears set (e.g. sun gear) and the input of the left planetary gear set (e.g. sun gear), respectively. The input shafts 44, 46 provide torque to the right planetary gear set 48 and the left planetary gear set 50. The planetary gear sets 48, 50 reduce the speed of rotation and increase the torque output of the system. A right output shaft 52 and a left output shaft 54 are connected through a right constant velocity joint 60 and a left constant velocity joint 58, respectively. The right and left constant velocity joints 60 and 58 are connected to the right axle 56 and left axle 62.

Figure 3:
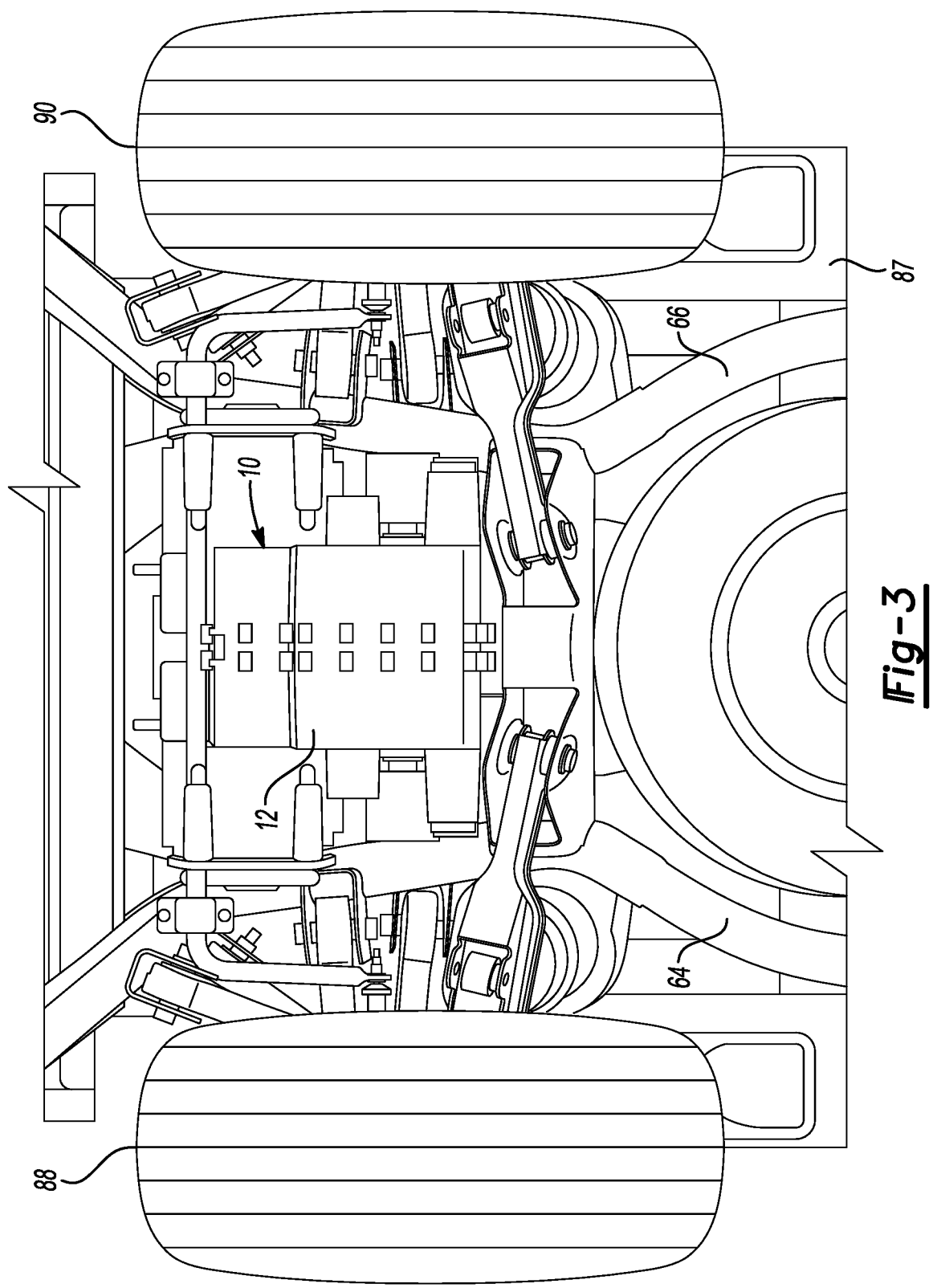
FIG. 3 is a fragmentary bottom plan view of a rear portion of a vehicle showing the chain drive dual motor and a split electric axle shown in FIG. 1.

The chain drive dual motor electric axle 10 is received between the right frame rail 64 and the left frame rail 66 that are shown in FIG. 3.

The central portion 18 of the housing 12 includes a central wall 68. The central wall 68 includes motor bearing supports 70 that, in turn, support motor anti-friction bearings 72. The central wall also includes planetary bearing supports 74 that support planetary anti-friction bearings 76. The central wall 68 extends between a front wall 78 and a rear wall 80.

Figure 2:
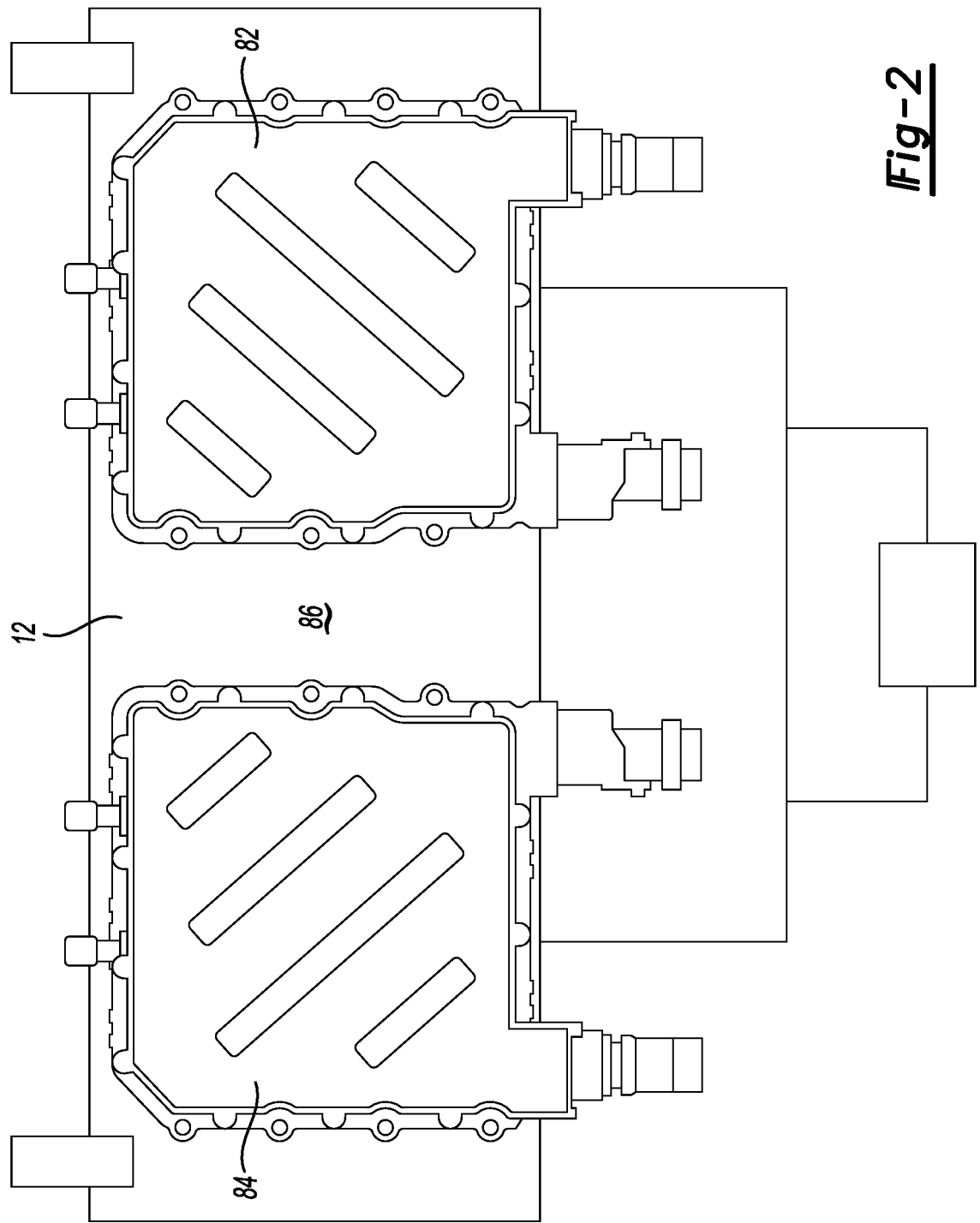
FIG. 2 is a top plan view of two inverter system controllers assembled on to a top surface of the chain drive dual motor and a split electric axle shown in FIG. 1.

Referring to FIG. 2, a right inverter system control 82 and a left inverter system control 84 are shown to be attached to a top surface 86 of the housing 12. The right inverter system control 82 and the left inverter system control 84 provide power and control the operation of the right side motor 20 and the left side motor 22, respectively. By assembling the right and left inverter system controls 82 and 84 to the top surface 86, space requirements for the system 10 are reduced.

Referring to FIG. 3, a partial view of a vehicle 87 is provided that illustrates the location of the chain drive dual motor electric axle 10 between the right frame rail 64 and the left frame rail 66. The housing 12 is shown to be centrally located relative to the right wheel 88 and left wheel 90.

Figure 4:
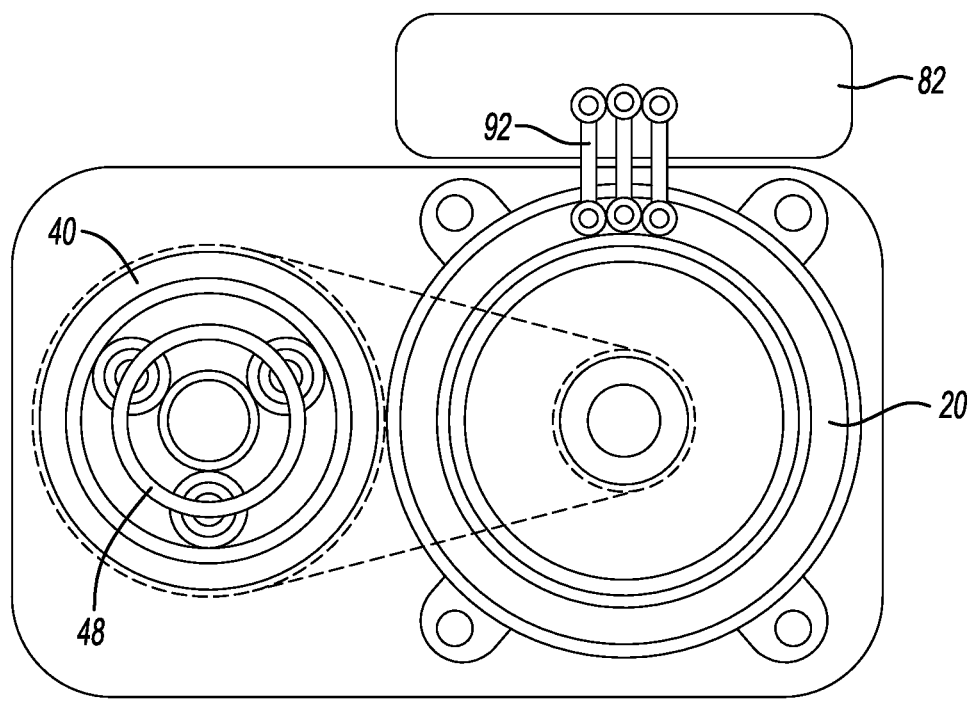
FIG. 4 is a schematic view showing an inverter system assembled to a top surface of one of the motors.

Referring to FIG. 4, the right side inverter system control 82 is shown assembled to a top surface of the right side motor 20 as previously described with reference to FIG. 2 with conductors 92 electrically connecting the inverter system control 82 to the motor 20. The right driven sprocket 40 and right planetary gear set 48 are shown to be rearward of the right side motor 20.

Figure 5:
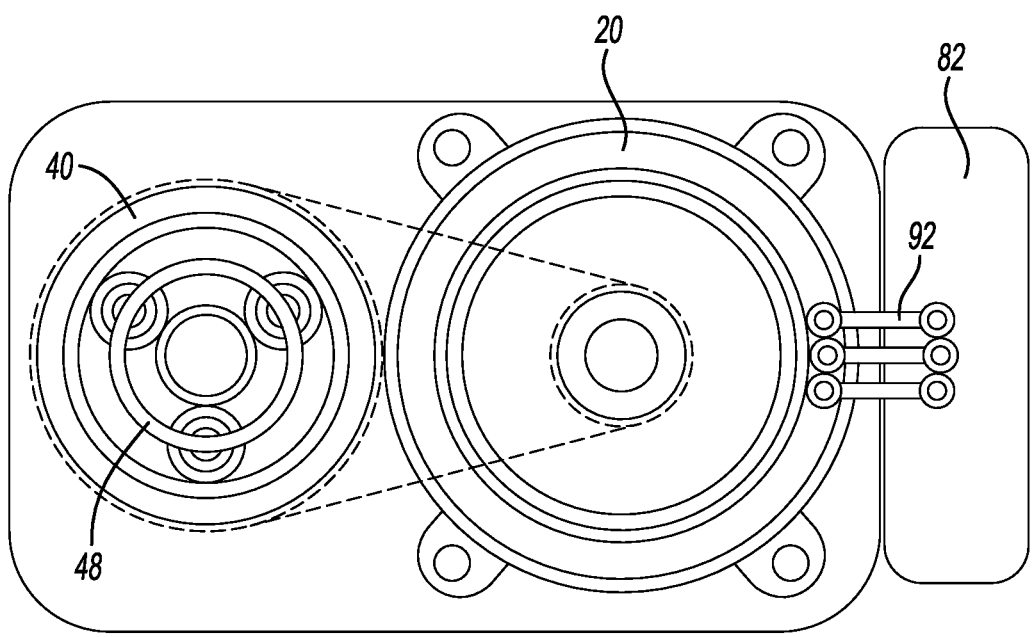
FIG. 5 is a schematic view showing an inverter system assembled to a front surface of one of the motors.

Referring to FIG. 5, the right side inverter system control 82 is shown assembled to a front surface of the right side motor 20 to reduce the height of the combination of the motor 20 and the inverter system control 82. Conductors 92 are electrically connected to the inverter system control 82 and to the motor 20. The right driven sprocket 40 and right planetary gear set 48 are shown to be rearward of the right side motor 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:
    a housing;
    a first motor disposed in the housing having a first rotor shaft;
    a first chain drive including a first driving sprocket connected to the first rotor shaft, a first chain, and a first driven sprocket connected to the first driving sprocket by the first chain;
    a first planetary gear set having a first input shaft connected to the first driven sprocket, and a first output shaft connected to a first constant velocity joint;
    a first axle connected to the first constant velocity joint, wherein the first axle is adapted to rotate a first wheel;
    a second motor disposed in the housing having a second rotor shaft;
    a second chain drive including a second driving sprocket connected to the second rotor shaft, a second chain, and a second driven sprocket connected to the second driving sprocket by the second chain;
    a second planetary gear set having a second input shaft connected to the second driven sprocket, and a second output shaft connected to a second constant velocity joint; and
    a second axle connected to the second constant velocity joint and adapted to rotate a wheel.

2. The apparatus of claim 1 wherein the housing further comprises:
    a right side portion, a left side portion, and a central portion joining the right side portion and the left side portion.

3. The apparatus of claim 2 further comprising:
    a right side drive including the first motor and the first rotor shaft, wherein the first motor is disposed in the right side portion of the housing, and the first planetary gear set disposed in the right side portion of the housing; and
    a left side drive having a second electric motor and the second rotor shaft, wherein the second motor is disposed in the left side portion of the housing, and the second planetary gear set disposed in the left side portion of the housing.

4. The apparatus of claim 1 further comprising:
    a right inverter system controller assembled to a top surface of the housing above the first motor; and
    a left inverter system controller assembled to the top surface of the housing above the second motor.

5. The apparatus of claim 1 wherein the housing is adapted to be assembled between a right frame rail and a left frame rail.

6. The apparatus of claim 1 wherein the first rotor shaft and the second rotor shaft are aligned on a first axis and the first input shaft and the second input shaft are aligned on a second axis that is offset from the first axis.

7. An apparatus comprising:
    a housing having a right side portion, a left side portion, and a central portion joining the right side portion and the left side portion;
    a right side drive including a right motor and a right rotor shaft, wherein the right motor is disposed in the right side portion of the housing, and a right planetary gear set disposed in the right side portion of the housing;
    a left side drive having a left motor and a left rotor shaft, wherein the left motor is disposed in the left side portion of the housing, and a left planetary gear set disposed in the left side portion of the housing; and
    a dual chain drive including a right side chain, a right side drive sprocket, and a right side driven sprocket disposed in the central portion of the housing, and a left side chain, a left side drive sprocket, and a left side driven sprocket disposed in the central portion of the housing, wherein the right rotor shaft drives the right side drive sprocket, the right side chain, and the right side driven sprocket, wherein the left rotor shaft drives the left side drive sprocket, the left side chain, and the left side driven sprocket, wherein the right side driven sprocket drives a right side input shaft of the right planetary gear set, and wherein the left side driven sprocket drives a left side input shaft of the left planetary gear set.

8. The apparatus of claim 7 further comprising:
    a right side output shaft of the right planetary gear set is adapted to drive a right side axle and a right side wheel, and wherein a left side output shaft of the left planetary gear set is adapted to drive a left side axle and a left side wheel.

9. The apparatus of claim 7 wherein the right rotor shaft extends from the right motor in the right side portion of the housing and into the central portion, and wherein the left rotor shaft extends from the left motor in the left side portion of the housing and into the central portion.

10. The apparatus of claim 7 wherein the central portion further comprises:
    a central wall extending between a front wall and a rear wall, the central wall including bearing supports for the right rotor shaft, the left rotor shaft, the right side input shaft of the right planetary gear set, and the left side input shaft of the left planetary gear set.

11. The apparatus of claim 10 further comprising:
    an antifriction bearing assembled to the bearing supports for the right rotor shaft, the left rotor shaft, the right side input shaft of the right planetary gear set, and the left side input shaft of the left planetary gear set.

12. The apparatus of claim 7 wherein the central portion further comprises:
a central wall extending between a front wall and a rear wall, and wherein the right side portion and the left side portion are attached to opposite sides of the central portion.

13. The apparatus of claim 7 further comprising:
a right inverter system controller assembled to a front surface of the housing above the right motor; and
a left inverter system controller assembled to the front surface of the housing above the left motor.

14. The apparatus of claim 7 wherein the housing is adapted to be assembled between a right frame rail and a left frame rail.

15. The apparatus of claim 7 wherein the right rotor shaft and the left rotor shaft are aligned on a first axis and the right side input shaft and the left side input shaft are aligned on a second axis that is offset from the first axis.

16. An apparatus comprising:
a right side motor having a right side rotor shaft;
a left side motor having a left side rotor shaft, wherein the right side rotor shaft and the left side rotor shaft rotate about a first axis of rotation;
a right side planetary gear set having a right side input shaft;
a left side planetary gear set having a left side input shaft, wherein the right side input shaft and the left side input shaft rotate about a second axis of rotation that is offset from the first axis of rotation;
a right side chain entrained about a right side driving sprocket secured to the right side rotor shaft and entrained about a right side driven sprocket secured to the right side input shaft;
a left side chain entrained about a left side driving sprocket secured to the left side rotor shaft and entrained about a left side driven sprocket secured to the left side input shaft;
a right side output shaft of the right side planetary gear set being connected to a right side constant velocity joint that is adapted to rotate a right wheel; and
a left side output shaft of the left side planetary gear set being connected to a left side constant velocity joint that is adapted to rotate a left wheel.

17. The apparatus of claim 16 further comprising:
a housing enclosing the right side motor, the left side motor, the right side planetary gear set, the left side planetary gear set, the right side chain, the right side driving sprocket, the right side driven sprocket and the right side input shaft, the left side chain, the left side driving sprocket, and the left side driven sprocket.

18. The apparatus of claim 16 further comprising:
a central wall extending between a front wall and a rear wall, the central wall including bearing supports for the right side rotor shaft, the left side rotor shaft, the right side input shaft of the right side planetary gear set, and the left side input shaft of the left side planetary gear set; and
an antifriction bearing assembled to each of the bearing supports for the right side rotor shaft, the left side rotor shaft, the right side input shaft of the right side planetary gear set, and the left side input shaft of the left side planetary gear set.

19. The apparatus of claim 16 further comprising:
a right inverter system controller assembled to a top surface of a housing above the right side motor; and
a left inverter system controller assembled to the top surface of the housing above the left side motor.

20. The apparatus of claim 16 further comprising:
a right inverter system controller assembled to a front surface of a housing above the right side motor; and
a left inverter system controller assembled to the front surface of the housing above the left side motor.

* * * * *